D. CRAIG.
REINFORCEMENT SCREW BORE.
APPLICATION FILED NOV. 30, 1908.
977,709.
Patented Dec. 6, 1910.
2 SHEETS—SHEET 1.
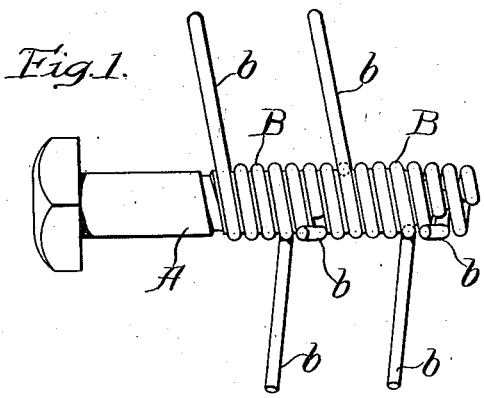
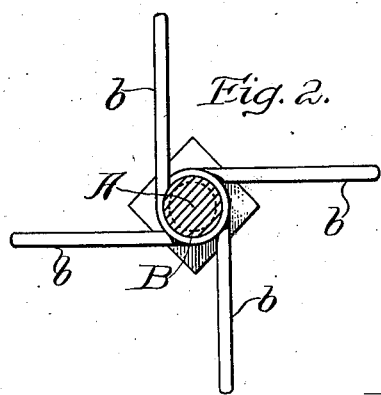
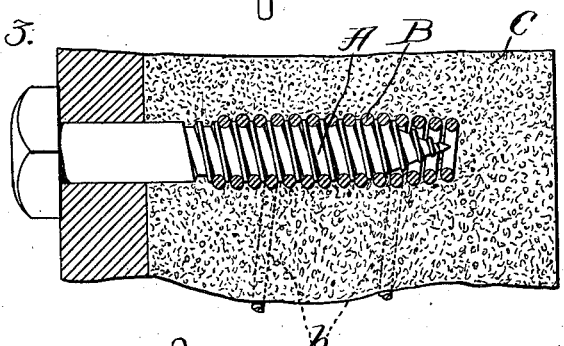
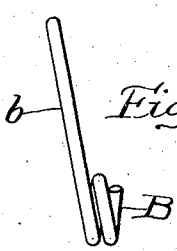
Witnesses:
Charles J. Woodberry
Josephine H. Ryan
Inventor.
David Craig
by
Roberts, Roberts & Cushman,
Attys.

D. CRAIG.
REINFORCEMENT SCREW BORE.
APPLICATION FILED NOV. 30, 1908.

977,709.

Patented Dec. 6, 1910.

2 SHEETS—SHEET 2.

Witnesses:
Charles S. Woodbury
Josephine H. Ryan

Inventor:
David Craig
by Roberts, Roberts & Cushman,
Attys.

UNITED STATES PATENT OFFICE.

DAVID CRAIG, OF MELROSE, MASSACHUSETTS, ASSIGNOR TO THE DAVID CRAIG COMPANY, A CORPORATION OF MAINE.

REINFORCEMENT SCREW-BORE.

977,709. Specification of Letters Patent. Patented Dec. 6, 1910.

Application filed November 30, 1908. Serial No. 465,368.

*To all whom it may concern:*

Be it known that I, DAVID CRAIG, a citizen of the United States, and resident of Melrose, in the county of Middlesex and State of Massachusetts, have invented new and useful Improvements in Reinforcement Screw-Bores, of which the following is a specification.

My invention relates to the reinforcement of screw bores and particularly the reinforcement of screw bores in hardened plastic material such as concrete, clay, plaster of paris, mortar, or the like, and comprises a helically formed wire for lining the walls of the screw bore to serve as a thread to engage the thread of a screw, together with other features hereinafter fully described and pointed out in the claims.

The invention further consists of the method of forming a reinforced screw bore hereinafter described and pointed out in the claims.

Figure 5:
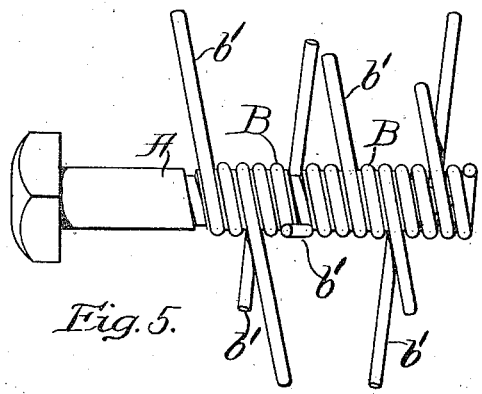
Figure 6:
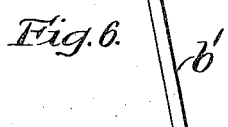
Figure 8:
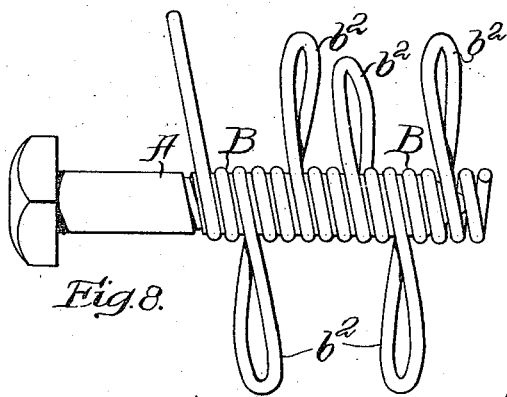
Figure 7:
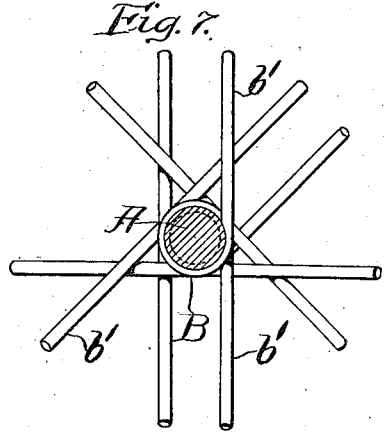
Figure 9:
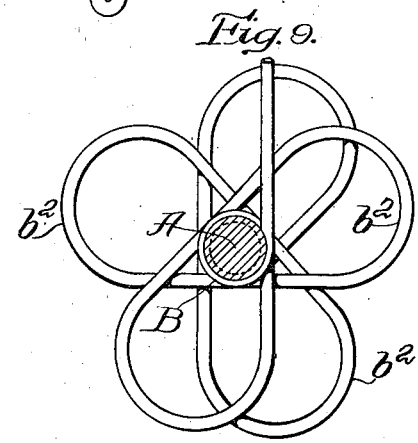

In the accompanying drawings which illustrate certain embodiments of my invention,—Figure 1 is a side view of a screw together with one form of wire reinforcement for the bore; Fig. 2 is a cross sectional view of the device shown in Fig. 1; Fig. 3 is a longitudinal section showing the device of Fig. 1 set into an object of hardened plastic material such as concrete; Fig. 4 is a detail view of one section of the form of reinforcement employed in Figs. 1, 2 and 3; Fig. 5 is a side view of a screw together with another form of wire reinforcement for the bore; Fig. 6 is a detail view of one section of the form of reinforcement employed in Fig. 5; Fig. 7 is a cross sectional view of the device shown in Fig. 5; Fig. 8 is a side view of a screw together with another form of wire reinforcement for the bore; and Fig. 9 is a cross sectional view of the device shown in Fig. 8.

A represents a bolt or screw herein shown as a lag screw.

B is a wire bent to form a helix adapted to serve as a screw thread to engage the thread of screw A. The helically formed wire B is provided with one or more arms by which the wire is securely anchored to the material to which it is applied. These arms may be variously formed and variously disposed and I have shown herein three forms well adapted to the purpose. In Figs. 1 to 4 inclusive one end of the helical wire extends tangentially to the helical body portion of the wire B to form the arms shown at *b*. In Figs. 5 to 7 inclusive both ends of the helical wire extend tangentially in opposite directions to form the arms *b'*; and in Figs. 8 and 9 the arms consist of loops $b^2$ extending at intervals and at various angles to the helical body portion of the reinforcement.

In the form shown in Fig. 8 the wire reinforcement is made in one piece extending the length of the screw. In the other figures I have shown the reinforcement as made in a plurality of sections superposed one upon the other.

In combining this helical wire reinforcement with an object of plastic material to form therein a reinforced screw bore, I assemble a screw and the wire reinforcement as shown in Figs. 1, 5 and 8 and then mold the concrete or other plastic material, while in its plastic condition, about the parts so assembled. Thus the helically formed wire reinforcment B is partially embedded in the plastic material C as shown in Fig. 3 and the arms projecting from B are wholly embedded in the material C, firmly anchoring the reinforcement B in the material. After the plastic material C has hardened I remove screw A by unscrewing it, leaving a screw bore in the hardened plastic material reinforced by the helical wire partially embedded in the walls of the bore, and forming a metallic screw thread securely anchored to the material, and capable of withstanding the strain incident to screwing another object such as a slab D tightly to the object C.

I claim:

1. A reinforcement for a screw bore comprising a wire bent to form a helix having one or more laterally projecting arms adapted to anchor said reinforcement to the material in which said bore is formed.

2. In combination with a mass of hardened plastic material having a screw bore formed therein, a reinforcement for said bore comprising wire bent to form a helix partially embedded in the walls of said bore, and one or more arms projecting from and formed integral with said reinforcement and embedded in said material.

3. In combination with a mass of hardened plastic material having a bore formed therein, a reinforcement for said bore comprising wire bent to engage the ribs or threads of a bolt or the like, said wire partially embedded in the walls of said bore and having integral arms extending laterally away from said bore and embedded in said material.

4. In combination with a mass of hardened plastic material having a screw bore formed therein, a reinforcement for said bore comprising wire bent to form a helix partially set into the walls of said bore, and a threaded bolt or screw engaging said helical wire with its thread extending into and part way through the spaces between the coils of said helix, that part of said spaces between the coils of said helix not occupied by said thread being filled with said hardened plastic material and arms made integral with said helical wire embedded in said material whereby said reinforcement is anchored within said bore.

5. In combination with a mass of hardened plastic material having a screw bore formed therein, a reinforcement for said bore comprising wire bent to form a helix partially set into the walls of said bore, the coils of said helix being spaced apart, and a threaded bolt or screw engaging said helical wire with its thread extending into and part way through the spaces between the coils of said helix, that part of said spaces between the coils of said helix not occupied by said thread being filled with said hardened plastic material portions of said wire extending tangentially from said coils and embedded in said material whereby said reinforcement is anchored within said bore.

6. In combination with an object made of hardened plastic material having a screw bore formed therein, a reinforcement for said bore comprising a plurality of wire sections superposed one upon the other, each section bent to form a helix and partially embedded in the walls of said bore, and each formed with a projecting arm embedded in said material.

7. In combination with an object made of hardened plastic material having a screw bore formed therein, a reinforcement for said bore consisting of wire bent to form a helix partially embedded in the walls of said bore, and a plurality of arms projecting from and formed integral with said reinforcement in different angular directions and embedded in said material.

Signed by me at Boston, Massachusetts, this 25th day of November, 1908.

DAVID CRAIG.

Witnesses:
ROBERT CUSHMAN,
CHARLES D. WOODBERRY.